: US005668633A

United States Patent [19]

Cheetam et al.

[11] Patent Number: 5,668,633
[45] Date of Patent: Sep. 16, 1997

[54] METHOD AND SYSTEM FOR FORMULATING A COLOR MATCH

[75] Inventors: William Estel Cheetam, Clifton Park, N.Y.; John Frederick Graf, Vienna, W. Va.

[73] Assignee: General Electric Company, Schenectady, N.Y.

[21] Appl. No.: 538,493

[22] Filed: Oct. 3, 1995

[51] Int. Cl.[6] ........................................ G01J 3/50
[52] U.S. Cl. ..................... 356/402; 356/425; 364/526
[58] Field of Search ......................... 356/402, 405, 356/406, 407, 425; 250/226; 364/526

[56] References Cited

U.S. PATENT DOCUMENTS

| 4,654,794 | 3/1987 | O'Brien | 356/326 |
| 4,887,906 | 12/1989 | Koehler | 356/4.02 |

FOREIGN PATENT DOCUMENTS

| 484564A1 | 5/1992 | European Pat. Off. |
| 61-30726A | 2/1986 | Japan. |
| 62732331 | 9/1994 | Japan. |
| 2192455 | 1/1988 | United Kingdom. |
| 90/00733 | 1/1990 | WIPO. |

OTHER PUBLICATIONS

"Color, Color Measurement and Colorant Formulation in the Textile Industry" By Re Derby, Jr., Textile Chemist & Colorist, vol. 5, No. 9, Sep. 1973, pp. 47–55.

"New Algorithm for Optimization of Computer Color Matching" by H. Zeng, et al., Optical Engineering, vol. 32, No. 8, Aug. 1993, pp. 1815–1817.

Primary Examiner—F. L. Evans
Attorney, Agent, or Firm—David C. Goldman; Marvin Snyder

[57] ABSTRACT

The present invention discloses a method and system for formulating a color match. In the present invention, there is provided a method and system for formulating a color match from a set of previously used color formulations. The present invention includes reading the color spectrum of a standard. After obtaining the color spectrum, the set of previously used color formulations are searched for a set of color formulas that approximates the color of the standard. Next, a color formula is selected from the set of color formulas that best matches the color of the standard. Then a test batch is made with the color formula having the best match and examined for its acceptability. The color formula with the best match is adapted if the formula is unacceptable. The adaptation includes at least one of manual adjusting color loadings of the color formula, synthesizing a match with the color standard, or searching through the set of previously used color formulations until there is an acceptable match. If the adapted color formula does not match the color of the standard, then the formula is further adapted until there is an acceptable match.

13 Claims, 8 Drawing Sheets

Match Weighting Factor

Select Weighting for Each Function

|   | high | med | low |   |
|---|---|---|---|---|
| 1 | ○ | ⊙ | ○ | Maximize Curve Match |
| 1 | ○ | ⊙ | ○ | Minimize cost |
| 1 | ○ | ⊙ | ○ | Minimize Load Level |
| 1 | ○ | ⊙ | ○ | Maximize Optical Density |
| 1 | ○ | ⊙ | ○ | High 450F to 550F Color Shift |
| 1 | ○ | ⊙ | ○ | Minimize Metamerism |

Synthesize Color Formula

Stop Searching When Formula With

○ Excellent Merit

⊙ Good Merit

○ Average Merit

○ Merit less than [25]

or when 11 of evaluations is > than [300]

Current Search Level [0]

Standard Black Colorant (Rcode) [R034431]

Standard White Colorant (Rcode) [R03205]

[Start]  [Cancel]

*FIG. 10*

| Colorant | Loading | Fix | | | Setpoint |
|---|---|---|---|---|---|
| R03205 | 2.4 | ☐ | ● | ○ | |
| R03431 | 0.00542 | ☐ | | | |
| R8141 | 0.453 | ☒ | ○ | ○ | 0.453 |
| R886 | 0.0012 | ☐ | ○ | ● | |
| TOTAL | 2.86 | ☒ | | | 2.86 |

Manual Formula Development — 70

Change Colorants
Color Match
Color Correct

Adjustment Mode
○ add or subtract
○ only add
○ only subtract

Evaluate    Optimize
ok          Cancel

FIG. 9

METHOD AND SYSTEM FOR FORMULATING A COLOR MATCH

BACKGROUND OF THE INVENTION

The present invention relates generally to color formulation development and more particularly to reproducing a specified color.

A color is typically reproduced by finding a set of colorants and loadings that produce a given color under all lighting conditions. Existing color matching practices use a color measuring system to match the color of a submitted standard (i.e., a color sample to be matched), such as MTS Color Match Software provided by MTS Colorimetrie Inc. The color measuring system consists of a spectrophotometer attached to a personal computer with software to control the system. The color matching process consists of reading the color of the standard and storing it in the computer. The individual color matcher then decides how many colorants should be used in the color formula and which colorants the computer can use when calculating the match. The computer will then try every combination of the selected colorants and present to the user the colorants and loadings that matches the color the best. With this formula, the color matcher will run a trial batch to see if the formula gives the correct color. If the color is matched, then the process is finished. However, if the color is not matched, then the color matcher can use the computer to help determine which of the colorants to add to make the color closer to the standard. This is done by changing the concentrations of the colorants and having the computer calculate the relative change in the color. With repeated calculations it becomes possible to determine if a change in the concentration of the colorants can improve the color match.

There are several drawbacks associated with using existing color matching systems. One problem with using existing color matching systems is that these systems do not have the ability to capture and use accumulated color matching experiences. For example, an individual may want to use their color matching experience and knowledge when selecting the colorants and the number of colorants to be used in the formula. Another problem with the existing color matching systems is that the computer tries every combination of different colorants. This brute force method of trying every combination is intractable for large number of colorants, which limits its usefulness. Many of the combinations tried by the brute force method have no chance of obtaining a match and would not be tried by an experienced color matcher. A third problem with the existing color matching systems is that these systems do not optimize the selection and loading level of colorants for properties other than color such as cost and pigment restrictions.

Therefore, in view of the above drawbacks, there is a need for a method and system that can capture accumulated color matching experiences of an individual color matcher and integrate them in existing color matching systems to optimally reproduce a specified color.

SUMMARY OF THE INVENTION

Thus, in accordance with the present invention, there is provided a method and system for formulating a color match from a set of previously used color formulations. The present invention includes reading the color spectrum of a standard. After obtaining the color spectrum, the set of previously used color formulations are searched for a set of color formulas that approximates the color of the standard. Next, a color formula is selected from the set of color formulas that best matches the color of the standard. Then a test batch made from the color formula having the best match is examined for its acceptability. The color formula from the test batch is adapted if the formula is unacceptable. The adaptation includes at least one of manual adjusting color loadings of the color formula, synthesizing a match with the color standard, or searching through the set of previously used color formulations until there is an acceptable match. If the adapted color formula does not match the color of the standard, then the formula is further adapted until there is an acceptable match.

While the present invention will hereinafter be described in connection with an illustrative embodiment and method of use, it will be understood that it is not intended to limit the invention to this embodiment. Instead, it is intended to cover all alternatives, modifications and equivalents as may be included within the spirit and scope of the present invention as defined by the appended claims.

BRIEF DESCRIPTION OF THE DRAWINGS

FIG. 7 is an illustration of a computer screen showing a match weighting factors window;

FIG. 9 is an illustration of a computer screen showing a manual formula development window; and FIG. 10 is an illustration of a computer screen showing a synthesize color formula window.

DETAILED DESCRIPTION OF THE PRESENT INVENTION

Figure 1:
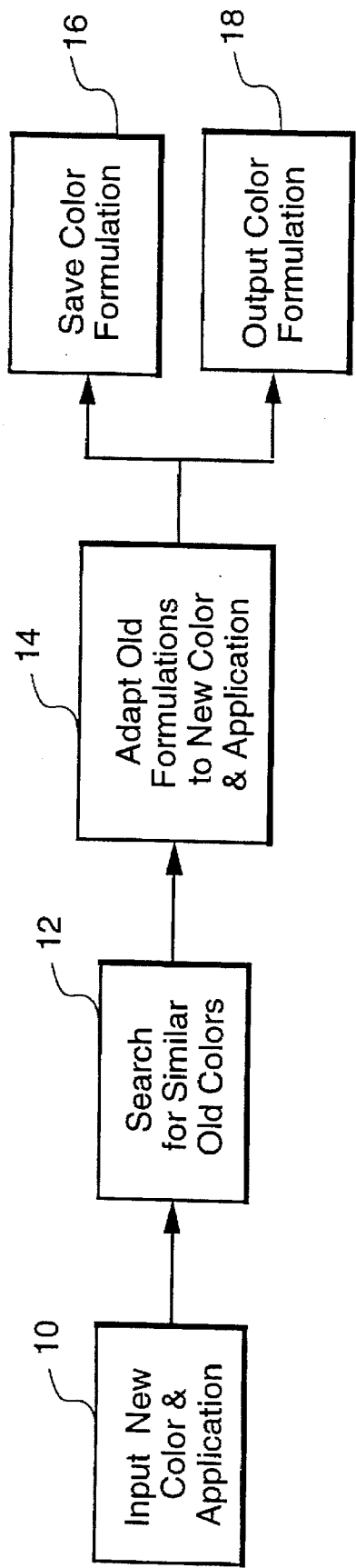
FIG. 1 is a block diagram describing a case-based reasoning process used in the present invention.

The present invention formulates a color match by using case-based reasoning principles. Case-based reasoning is a well known computer science methodology that has been used in a wide range of applications. The basic idea of case-based reasoning is to solve new problems by adapting solutions that were used to solve similar problems in the past. Storing decisions that were made in the past removes the need of creating new solutions from basic principles. A block diagram describing the case-based reasoning process of the present invention is shown in FIG. 1. At 10, a color standard made from a material such as plastic, paper, cloth, ceramic, or the like, having a new color is received. The standard is the color sample to be matched. Given the color, the present invention searches a historical case-database at 12 containing previously run matches having varying colors to identify cases which may provide the closest match to the desired color. The present invention then adapts the colorant loadings (i.e., pigments) of the closest cases at 14 to provide a better match with the desired color. The adaptation takes into account factors such as a spectral curve match, absolute loading level, opacity, adjustability, metamerism, grade-colorant loading restrictions, etc. The present invention then saves the adapted color formulation at 16 and outputs the color formula with the highest probability of success to a user at 18.

Figure 2:
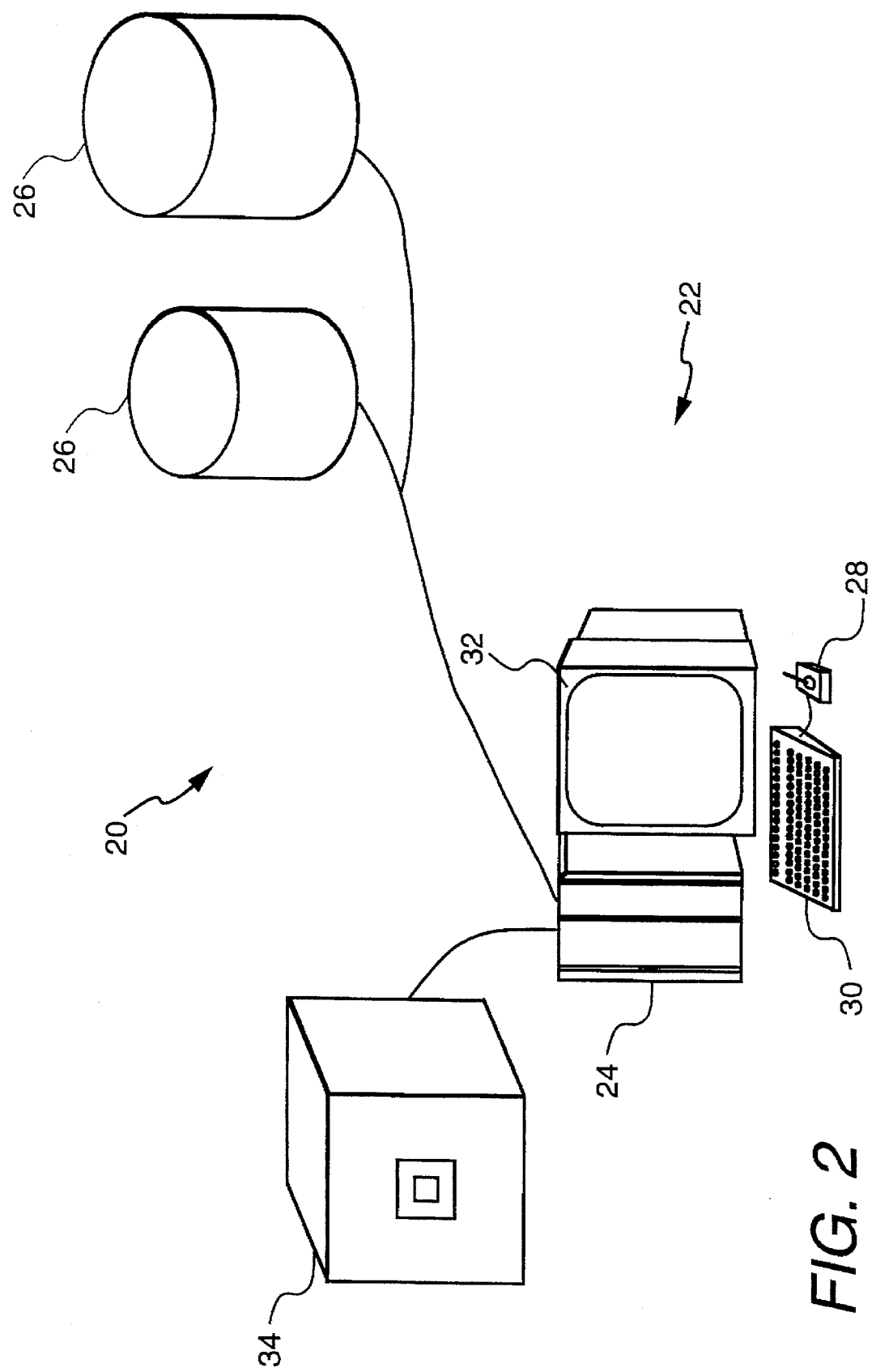
FIG. 2 is a diagram illustrating the system used in the present invention.

FIG. 2 is a diagram illustrating a system 20 used in the present invention. The system includes a processor 22 such as a personal computer having a 80386 processor or higher. In the preferred embodiment of the present invention, a 486 CPU 50 MHz personal computer with 8 megabytes of RAM provides the best results. The processor is run by application software embodied in a hard disk 24 such as Microsoft MS-DOS® version 3.1 or later version or Microsoft Windows®. A user communicates with the processor 22 and a database 26 by a mouse or other pointing device 28 and a keyboard 30. The results are displayed on a display 32. Connected to the processor is a spectrophotometer 34 such as a MacBeth® 7000 or 2020 for reading the color of a standard. The system 20 includes a test batch unit 35 for making color standards according to the color formulas determined by the processor 22.

Figure 3:
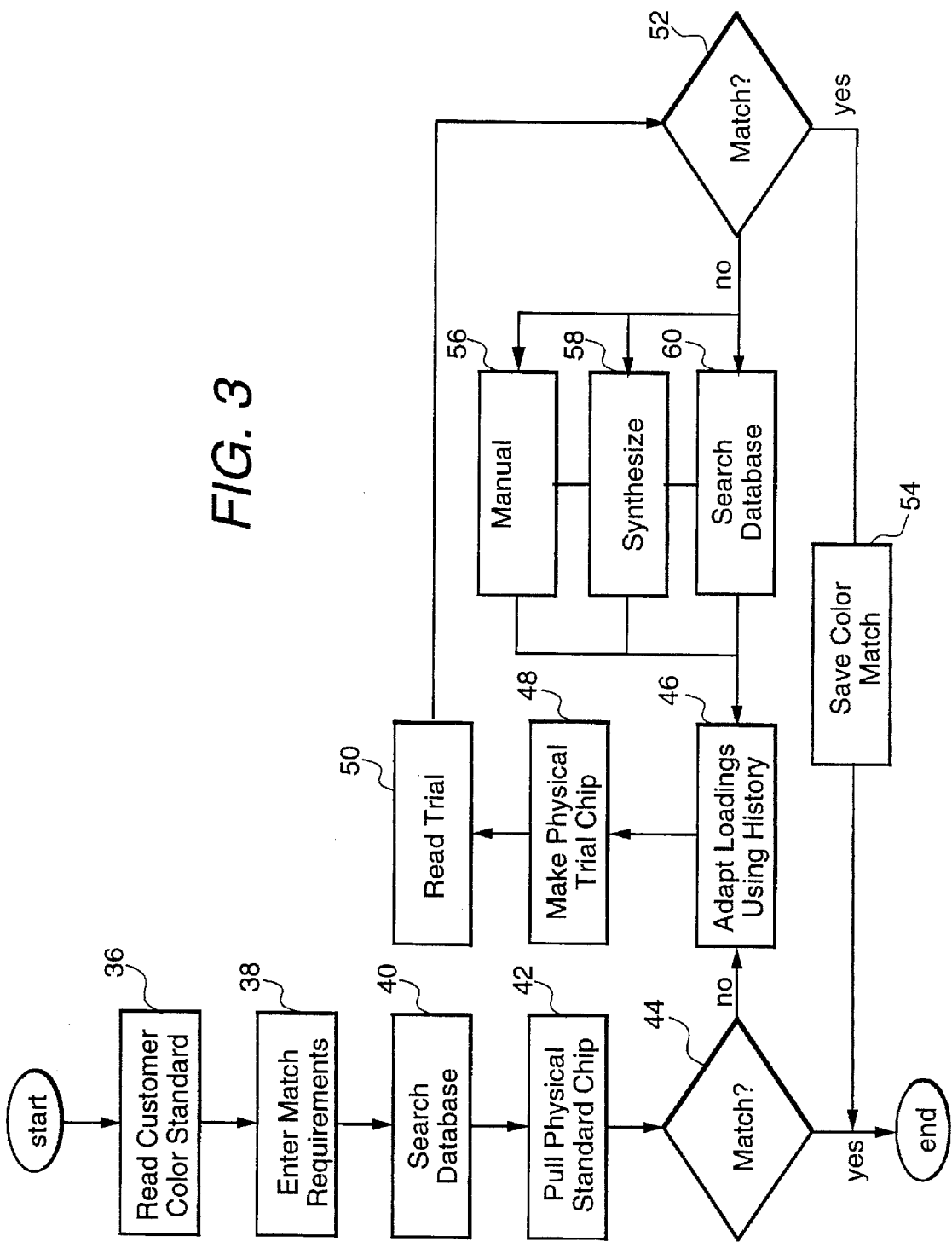
FIG. 3 is a flow chart illustrating the operation of the present invention.

FIG. 3 is a flow chart illustrating the operation of the present invention. The color match process of the present invention starts at 36 after receiving information regarding the color of a standard. As mentioned above, the illustrative embodiment of the present invention is used to match the physical color of a standard made from material such as plastic, paper, cloth, ceramic, etc. More specifically, the present invention can be used to formulate colors for various types of resins and grades of plastic. Basically, the standard is placed in the spectrophotometer 34 and the color spectrum of the standard is read and then sent to the processor 22. Next, key information of the match such as the resin and grade of the material in which a match is desired is entered into the processor by using the mouse 28 and the keyboard 30 at 38. Additional information such as the relative importance of cost, color, opacity, etc. may be entered at 38. Next, the database 26 of previously used color formulations is searched at 40 for formulations that will provide the "best" previous match to the color of the standard. Then a sample of the previous match that provides the best match is pulled at 42 and further inspected at 44 to determine if the color of the previous match does indeed provide an acceptable match. If the match is acceptable, then the process is over. However, if the match is unacceptable, then the color formula of the best match is adapted at 46 so that it more closely matches the requested color of the standard that was read at 36. Next, a trial run of the standard is made at 48 in the test batch unit 35 using the adapted formula. The color of the result of the trial is then read by the spectrophotometer at 50. Then the trial result is further inspected at 52 to determine if the adapted color does provide a match. If the new match is acceptable then the adapted colorant loadings are saved into the database at 54 and the match is finished. However, if the match is not acceptable, then there are three options available. First, the color loadings of the adapted standard can be manually or automatically adjusted at 56. Second, a match that is not based on the previous match can be synthesized at 58. Thirdly, the database 26 can be searched again to find a different match and then repeat any adaptation steps that may be necessary. After one of the three options are performed the cycle continues until a match is found at 52. When the end is reached, a formula is obtained that gives the best color match and balance of all other important properties of the desired standard.

Figure 4:
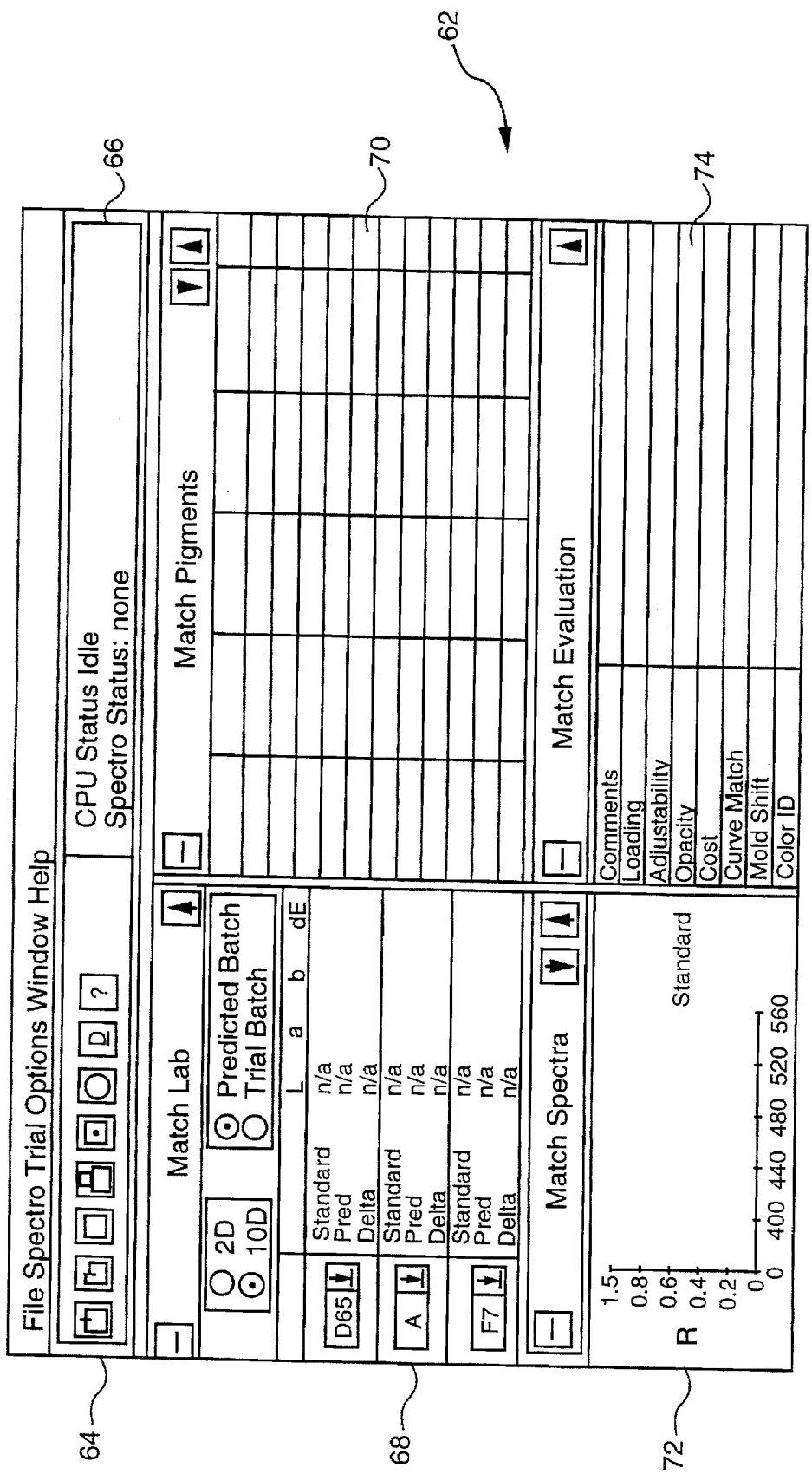
FIG. 4 is an illustration of a computer screen generated by the present invention.

After present invention has been opened by the processor 22, the display will generate a computer screen 62 as provided in the illustration of FIG. 4. The computer screen contains a menu bar 64 and a tool bar 66. In addition, there are four windows, a match lab window 68, a match pigments window 70, a match spectra window 72, and a match evaluation window 74. The match lab window 68 shows the L*a*b of the standard that is trying to be matched. The L*a*b is a numerical method of representing a color. For example, L represents how light to dark a standard is, while b represents how blue to yellow a standard is, and a represents how green to red a standard is. The three L*a*b and deltas are calculated under three different lighting conditions. In the present invention, a wide range of lighting conditions can be specified for determining if there is a match. The match spectra window 72 shows the spectral curve of the standard and any trial runs that were made. The predicted trial curve is calculated from knowledge of the absorption and scattering constants of the colorants while the actual trial curve is read using the spectrophotometer 34. The match pigments window 70 displays the colorants and loadings for every trial run, with the colorant names set forth in the leftmost column. Every other column contains a different trial at matching the standard. The match evaluation window 74 describes various attributes for each trial run.

Figures 5, 6:
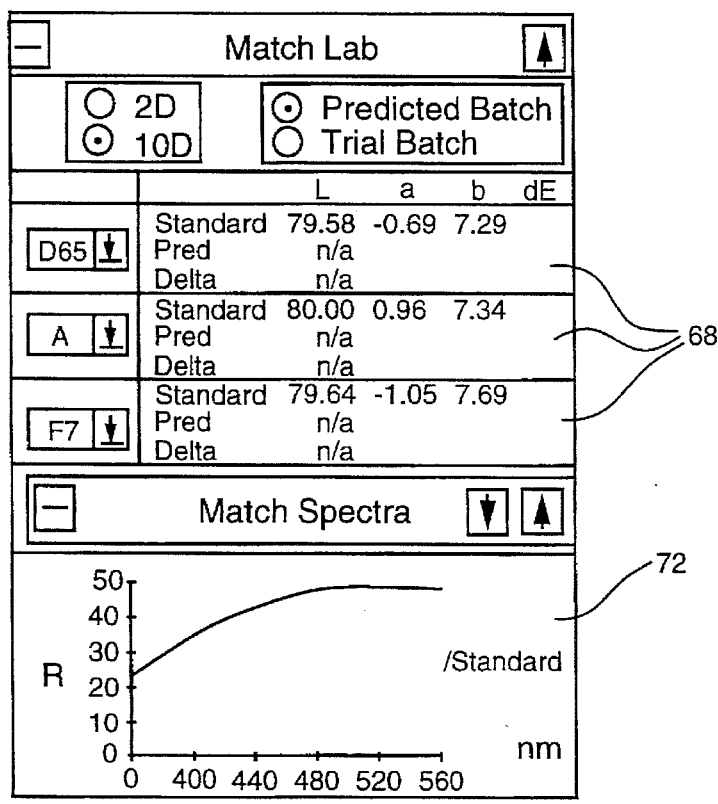
FIG. 5 is an illustration of a computer screen showing updated match lab and match spectra windows.
FIG. 6 is an illustration of a computer screen showing a match description window.

After starting the present invention, the spectral curve of the standard to be matched is measured with the spectrophotometer 34. Typically, the standard is placed over the spectrophotometer port and its spectral curve is read by using the toolbar icon representing the spectrophotometer on the toolbar 66 or by using the read command found on the spectro menu in the menu bar 64. After the spectrum has been read, the match spectra window 72 is updated to display the spectral curve of the standard and the match lab window 68 is also updated to show the L*a*b values of the spectrum under the selected lighting conditions. An example of the updated match lab and match spectra windows is shown in FIG. 5. Note that the match spectra window 72 displays the spectral curve from 400 to 700 nm for the standard read with the spectrophotometer 34, the spectral curve that is determined for the predicted trial run after adaptation, and the actual trial results after the test batch has been read by the spectrophotometer.

The next step in the matching process is to enter the match description and characteristics for the standard to be matched and then to search for similar previous color matches in the case database 26. This step is started by either clicking on an icon on the toolbar 66 or by selecting the get trial menu item from the menu bar 64. Before searching the case database 26, the user is prompted to enter a match description and match weighting factors. An example of a match description window 76 is shown FIG. 6. The match description window 76 asks the user to enter a description of the match being done. The next window to appear will be a match weighting factors window 78 which is illustrated in FIG. 7. These weighting factors are used to specify the relative importance of the attributes of the desired match. The higher the number (or weight) the more emphasis that is given to that attribute.

Once the reflectance curve has been read and the importance of the various attributes have been specified, the present invention searches for the best previous matches in the case database 26. The search for similar previous color matches is done by comparing each case in the case database with the standard. The sum of squared differences between the reflectance curves of the case and the standard is calculated and given a score for the match, with a smaller value being a better match. Other attributes of the match (cost, optical density, color shift, adjustability) are determined from knowledge of the colorants of the standard. The best five case matches are then obtained.

These five cases are then adapted so that they provide a better match to the standard. The cases from the case database are not usually an exact match for the standard so this adaptation is usually needed. The adaptation is done by varying the colorant loadings while evaluating the change in quality of the color match as determined by a merit function that takes into account factors such as curve match, loading, metamerism, cost, optical density, color shift, and adjustability. These modifications obey any pre-specified colorant loading level restrictions and guidelines which may have been previously set. When the adaptations are finished the five previous cases are sorted by their merit score. The adapted match with the best merit score is suggested as the best match to examine in further detail.

Figure 8:
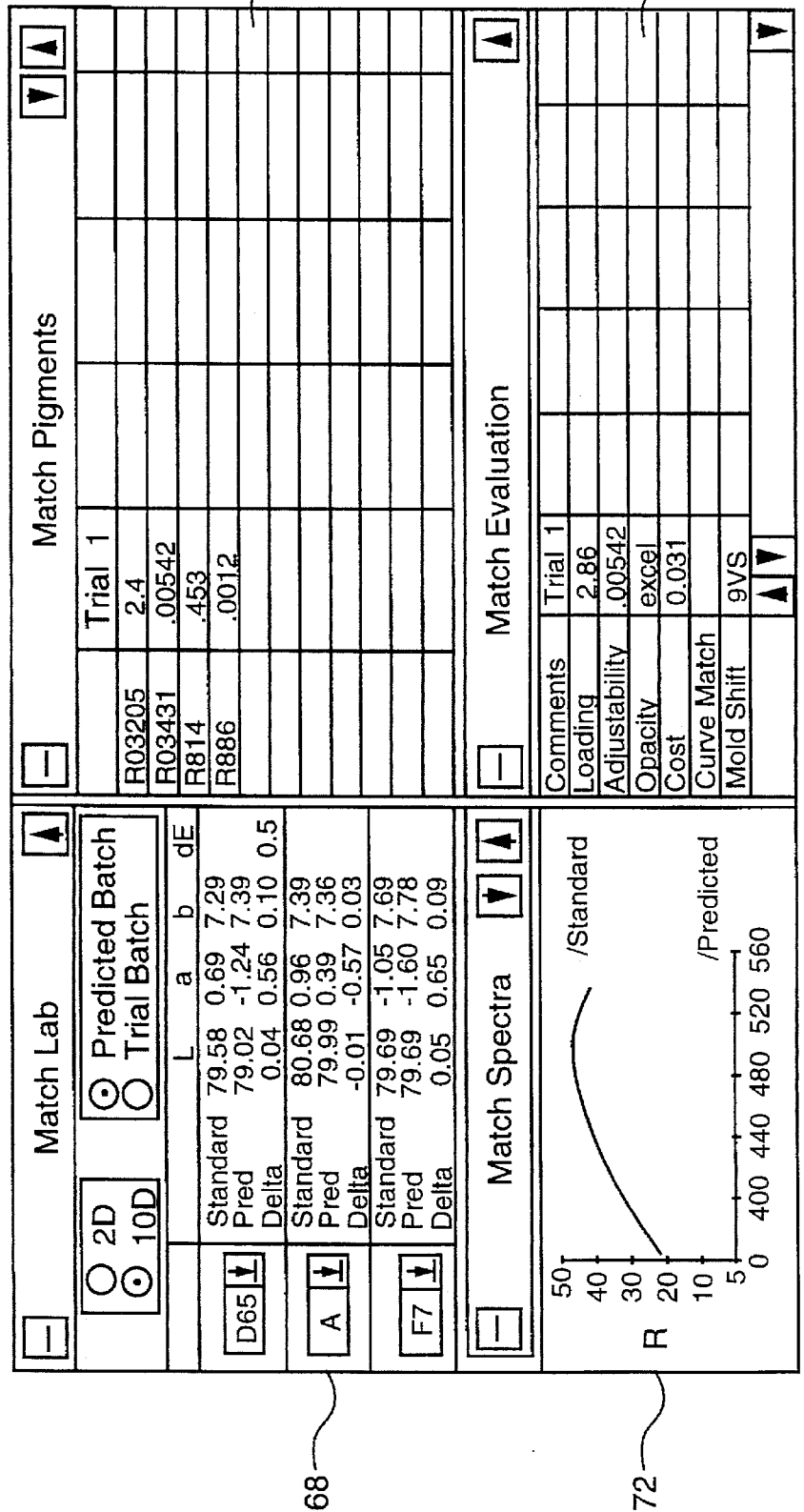
FIG. 8 is an illustration of a computer screen showing updates of the main screen window of FIG. 4.

After the best match is found, the main screen windows are updated to show the match. An example of the updates of the main screen window are shown in FIG. 8. The example shown in FIG. 8 illustrates a suggested trial, Trial_1, and the absolute colorant loadings in parts per hundred (pph) for a resin. There is a set conversion factor menu item in the options menu of menu bar 64 which allows the user to scale the formula to any batch size. The match spectra window 72 shows both the standard spectra and the predicted trial spectra and the match lab window 68 shows the respective L*a*b values.

After the case database 26 has been searched, the color ID of the color formula that was used as a starting point to generate the suggested trial formula is pulled along with a sample of the standard containing this color. Then it is visually compared with the standard that is trying to be matched. If the match is good enough, then this color will be used. However, if the match is poor or fails one of the application requirements, then the process continues on with the formulation development. Once the best possible match has been found a test batch is then created in the test batch unit 35. In the illustrative embodiment, the test batch is a small sample of the plastic with the specified colorants that is molded into a plaque or chip. Because the predictions are based on a particular resin and grade of material, it is necessary to create a test batch using the same resin and grade for the greatest chance of success.

After the test batch has been created, samples from the physical trial are placed over the spectrophotometer port and their spectral curve is then read. As mentioned above, a decision is then made to determine if the spectral curves and visual match are good enough for its desired application. If the trial is good enough, then the match is finished. However, if the trial does not give a good enough match, then the user has to adjust either the relative ratios of the colorants or try a different set of colorants and loadings. This is done by either manually correcting the colorants, synthesizing new colorants, or selecting an alternative formula by performing a new search. All of these options are accessed through the trial menu on the menu bar 64.

An example of a manual formula development window 80 is shown FIG. 9. The manual formula development window 80 allows the user to manually change the colorants and their loadings. The processor 22 uses this manually inputted formula to create a trial and will update all of the detail windows. The manual formula development window comprises options such as a color match, color correct, and optimize. All three of these use a least squares fitting procedure to change the colorant loadings to match the standard spectral curve. The least squares procedure can be customized to obey user inputted ranges by clicking on the fix boxes. For example, colorant R814 has its fix box selected (shown by a cross in the box next to the loading of 0.453 in FIG. 9). When the fix box is selected the user can cause the least squares fitting routine to obey the loading set point for this colorant to be equal to, greater than, or less than the specified set point loading value. For the colorant R814, the set point is 0.453 and it is requested that the loading be equal to this set point when least squares fitting the formula loadings to fit the standard spectral curve. The three functions color match, color correct, and optimize each have a different mode of operation. For instance, color match allows the absolute loadings of the colorants to be changed, color correct is a quick way of telling the system to keep the total loading of colorant constant but allow the colorant ratios to change, while optimize is a quick way of telling the system 20 to keep all the ratios of the colorants constant but to find the best total loading of colorants.

As mentioned above, another alternative is to search the case database again 26 since there can be multiple historical matches in the database that could be used as good starting points for the color match. If the historical match that is rated best by the present invention as a starting point does not lead to an acceptable solution for some reason, then the user can try the next best historical match as a starting point. Typically, this can be accomplished by using a toolbar icon on the toolbar 66 or selecting the trial menu from the menu bar 64.

Another method of obtaining a match is to synthesize one from scratch using any of the colorants in the database. The synthesize method is used if the previous matches found in the database are not satisfactory. An example of a synthesize color formula window 82 is shown in FIG. 10 after this option has been selected. The window 82 enables the user to customize the synthesizing function. For example, the colorant combinations that are most likely to provide a match, based on a statistical analysis of previous matches, are searched first and the search is stopped when it satisfies the criteria specified by the color matcher. This routine can be called over and over again since it considers the most probable combinations of colorants first. Each time this routine is called the current search level will be incremented by some integer value which the system uses to determine how deep into the search to begin at. Each possible trial formula is scored by a merit function that returns a value which represents the quality of the match, with the smaller values being a better match. A merit score of less than 5 is an excellent match, while one of greater than 5 but less than 25 is a good match, and one that has a merit score greater than 25 is an average match. The top portion of the synthesize color formula window 82 allows the user to stop the calculation when an excellent, good, or average match is found or when a set number of trials have been evaluated. When a match is approved, that match is stored in the case database so that it can be used as a previous case for a future match. This allows the formulation system 20 to learn new matches and grow as time goes by.

Through the use of the present invention, the following benefits are obtained. First, a more consistent product behavior is attained by standardizing the formulation process and basing the formulation on product history. Second, better product quality and lower manufacturing costs are attained through improved formulations (e.g., optimizing colorant loading for desired product properties). Third, product development time is decreased by reducing the number of adjustments and trials during the formulation process.

It is therefore apparent that there has been provided in accordance with the present invention, a method and system for formulating a color match that fully satisfy the aims and advantages and objectives hereinbefore set forth. The invention has been described with reference to several embodiments, however, it will be appreciated that variations and modifications can be effected by a person of ordinary skill in the art without departing from the scope of the invention.

We claim:

1. A computer-implemented method for formulating a color match from a set of previously used color formulations, the method comprising the steps of:

reading a color spectrum of a standard;

searching the set of previously used color formulations for a set of color formulas that approximates the color of the standard;

determining from the set of color formulas a color formula that best matches the color of the standard;

examining a test batch made from the color formula having the best match and determining the acceptability of the formula;

adapting the color formula of the test batch to the color of the standard if the formula is unacceptable, the adapting including at least one of manual adjusting color loadings of the color formula, synthesizing a new match with the color standard by using new colorants and color loadings, or searching through the set of previously used color formulations until there is a more acceptable match;

determining if the adapted color formula matches the color of the standard; and adapting the adapted color formula further until there is an acceptable match with the color of the standard.

2. A computer-implemented method according to claim 1, further comprising the step of entering matching requirements for obtaining the set of color formulas that approximates the color of the standard.

3. A computer-implemented method according to claim 1, further comprising the step of making a standard with the adapted color formula.

4. A computer-implemented method according to claim 3, further comprising the step of reading the color spectrum of the standard.

5. A computer-implemented method according to claim 1, further comprising the step of storing the color formula having the acceptable match with the set of previously used color formulations.

6. A computer-implemented method according to claim 1, wherein the manual adjusting of color loadings comprises adjusting the relative ratios of the colorants and the loadings of the colorants in the color formula.

7. A computer-implemented method according to claim 1, wherein the synthesizing of a new match with the color standard comprises using a statistical analysis to determine new colorants and colorant loadings that most likely match the color standard.

8. A system for formulating a color match from a set of previously used color formulations, the system comprising:

a spectrophotometer for reading the color spectrum of a standard; and a processor for formulating a color match from the set of previously used color formulations to the color spectrum of the standard read from the spectrophotometer, the processor including means for searching the set of previously used color formulations for a set of color formulas that approximates the color of the standard; means for determining from the set of color formulas a color formula that best matches the color of the standard; means for examining a test batch made from the color formula having the best match and determining the acceptability of the formula; means for adapting the color formula of the test batch to the color of the standard if the formula is unacceptable, the adapting including at least one of manual adjusting color loadings of the color formula, synthesizing a new match with the color standard by using new colorants and color loadings, or searching through the set of previously used color formulations until there is a more acceptable match; means for ascertaining if the adapted color formula matches the color of the standard; and means for adjusting the color formula further until there is an acceptable match with the color of the standard.

9. A system according to claim 8, wherein the processor further comprises means for entering matching requirements.

10. A system according to claim 8, further comprising means for making a standard with the adapted color formula.

11. A system according to claim 8, wherein the processor further comprises means for storing the color formula having the acceptable match with the set of previously used color formulations.

12. A system according to claim 8, wherein the manual adjusting of color loadings in the adapting means comprises adjusting the relative ratios of the colorants and the loadings of the colorants in the color formula.

13. A system according to claim 8, wherein the synthesizing of a new match with the color standard in the adapting means comprises using a statistical analysis to determine new colorants and colorant loadings that most likely match the color standard.

* * * * *

UNITED STATES PATENT AND TRADEMARK OFFICE
CERTIFICATE OF CORRECTION

PATENT NO. : 5,668,633

DATED : September 16, 1997

INVENTOR(S) : William Estel Cheetham, et al

It is certified that error appears in the above-identified patent and that said Letters Patent is hereby corrected as shown below:

On the title page;

The First Inventor's Name is incorrectly spelled as:

WILLIAM ESTEL CHEETAM

The Patent should be corrected so that the First Inventor's Name is spelled as:

WILLIAM ESTEL CHEETHAM

Signed and Sealed this

Tenth Day of February, 1998

Attest:

BRUCE LEHMAN

Attesting Officer     Commissioner of Patents and Trademarks